United States Patent

Heimann

[15] 3,699,531

[45] Oct. 17, 1972

[54] DIGITAL DATA SELECTION AND DISPLAY SYSTEM

[72] Inventor: Richard F. Heimann, Sudbury, Mass.

[73] Assignee: Raytheon Company, Lexington, Mass.

[22] Filed: March 13, 1970

[21] Appl. No.: 19,371

[52] U.S. Cl. ............................340/172.5, 340/324 A

[51] Int. Cl. ...............................................G06f 3/14

[58] Field of Search.......340/172.5, 324 A, 152, 153, 340/154

[56] References Cited

UNITED STATES PATENTS

| | | | |
|---|---|---|---|
| 3,564,510 | 2/1971 | Bagley et al. | 340/172.5 |
| 3,566,370 | 2/1971 | Worthington, Jr. et al. | 340/172.5 |
| 3,573,735 | 4/1971 | Clark | 340/172.5 |
| 3,581,290 | 5/1971 | Sugarman | 340/172.5 |
| 3,582,936 | 6/1971 | Kite et al. | 340/172.5 X |
| 3,588,838 | 6/1971 | Felcheck | 340/172.5 |
| 3,478,326 | 11/1969 | Bourghardt | 340/172.5 |
| 3,056,111 | 9/1962 | Finkler et al. | 340/172.5 |
| 3,071,753 | 1/1963 | Fritze et al. | 340/172.5 X |
| 3,241,117 | 3/1966 | Schottle et al. | 340/172.5 X |
| 3,252,143 | 5/1966 | Sundblad | 340/172.5 |
| 3,292,489 | 12/1966 | Johnson et al. | 340/172.5 X |
| 3,307,156 | 2/1967 | Durr | 340/172.5 |

*Primary Examiner*—Paul J. Henon
*Assistant Examiner*—Melvin B. Chapnick
*Attorney*—Milton D. Bartlett, Joseph D. Pannone and Jeffrey P. Morris

[57] ABSTRACT

A real-time communications system in which a dynamic memory recirculates character address information for an entire frame of information for display in a line raster on a cathode ray tube and in which a plurality of selection switches aligned with the individual lines of the raster permit an operator to select new frames of character information from a central memory for display and recirculation in accordance with the character information contained in the individual line selected.

17 Claims, 6 Drawing Figures

INVENTOR
RICHARD F. HEIMANN
BY Jeffrey P. Morris
ATTORNEY

INVENTOR
RICHARD F. HEIMANN
BY Jeffrey P. Morris
ATTORNEY

INVENTOR
RICHARD F. HEIMANN
BY Jeffrey P. Morris
ATTORNEY

INVENTOR
RICHARD F. HEIMANN
BY Jeffrey P. Morris
ATTORNEY

INVENTOR
RICHARD F. HEIMANN
BY
ATTORNEY

INVENTOR
RICHARD F. HEIMANN
BY Jeffrey P. Morris
ATTORNEY

INVENTOR
RICHARD F. HEIMANN
BY [signature]
ATTORNEY

DIGITAL DATA SELECTION AND DISPLAY SYSTEM

BACKGROUND AND SUMMARY OF THE INVENTION

A problem in the prior art in large computer controlled communications systems in which a great volume of information must be accessed by personnel untrained in computer information retrieval techniques has been the development of a system which such personnel can effectively utilize. The present invention solves this problem by providing a cathode ray tube display system for displaying data such as inventory, accounts receivable, payroll and patient data, for example, in hospitals. The invention can perform similar functions in the banking, insurance and retailing industries. Operationally, a nurse, for example, has instant access to patient data through a display console embodying the present invention. This information is displayed in a raster of lines on a cathode ray tube screen, adjacent to which are a plurality of selection switches physically aligned with the individual lines on the display. By actuating a selection switch, the nurse may obtain an additional frame of data pertaining in detail to the information contained in the selected line. This additional frame of information is also arranged in a raster of lines enabling another series of choices as to additional data to be made, thereby allowing an operator to obtain progressively more detailed information on a subject of interest by merely pushing a button aligned with a line of interest on the cathode ray tube display. A plurality of like display consoles of the present invention may be operated from a central memory.

Operationally, character information for a complete raster of the cathode ray tube is dynamically stored in a recirculating device, such as a sonic or ultrasonic delay line, so that the entire contents of the delay line are fed through a simple readout circuit which continuously supplies the stored character information in the form of character address signals to a monoscope for generation of the displayed characters from a character target matrix and also non-destructively recirculates the stored frame of information for resupply to the monoscope at a frame scan rate of, for example, in excess of 60 times per second so the objectionable flicker does not occur on the cathode ray tube face. When a cathode ray tube line switch is selected, a digitally coded signal is developed and sent to a central computer, which responds in accordance with any desired predetermined program to enter a new frame of character information into the recirculating memory, erase the old information, and display the new frame on the cathode ray tube display.

BRIEF DESCRIPTION OF THE DRAWING

This invention will be further described with reference to the accompanying drawings wherein.

DESCRIPTION OF THE PREFERRED EMBODIMENT

Figure 1:
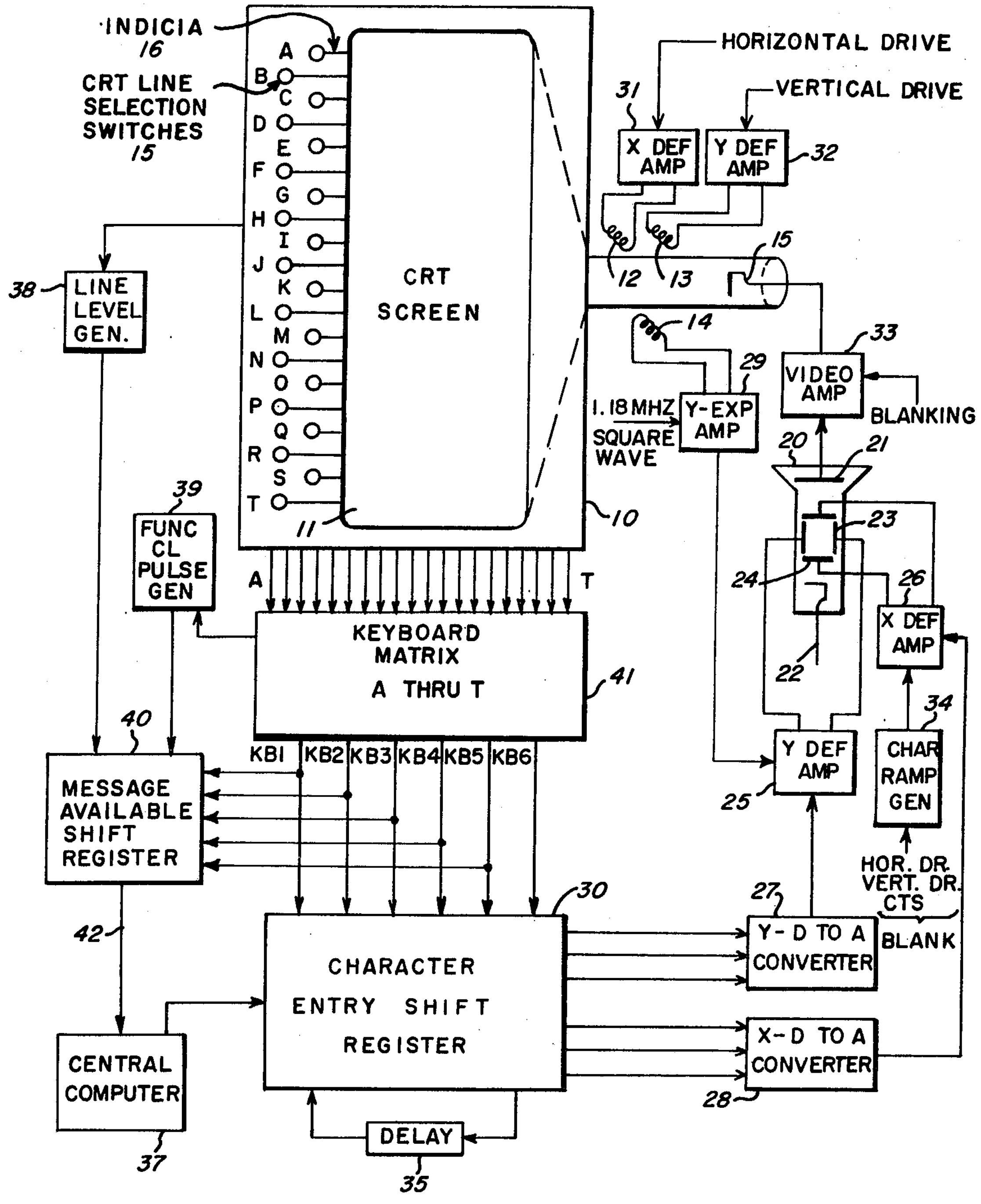
FIG. 1 is a preferred embodiment of the invention.

Referring now to FIG. 1, there is shown a cathode ray tube display system embodying the invention. Cathode ray tube 10 of conventional type includes fluorescent screen 11, horizontal deflection coil 12, vertical deflection coil 13, high-frequency auxiliary vertical deflection coil 14, cathode 15, auxiliary electrodes and a high voltage anode (not shown). These elements of the cathode ray tube are supplied with biasing voltages and currents in accordance with well-known practice to develop a raster of lines of characters.

Located on one side of the screen 11 are twenty switches 15 identified as A through T, which are aligned with lines 4 through 23 of the screen presentation by indicia lines 16 which enable an operator to visually line up the appropriate switch with its corresponding line on the cathode ray tube screen presentation. Of course, any number of cathode ray tube line selection switches may be employed which may align with any desired lines on the cathode ray tube screen. When a cathode ray tube line selection switch is depressed, the information displayed on the cathode ray tube screen is erased and replaced by a complete new frame of information which corresponds to the data contained on a line in the previous display adjacent to the depressed cathode ray tube line selection switch. This operation will be explained later with reference to FIG. 7.

Cathode 15 is fed negative video signals and positive blanking signals from the output of a video amplifier 33 which may have a video band-pass characteristic of from 15 to 50 megacycles or greater depending upon the desired writing speed. A video preamplifier (not shown) amplifies incoming signals to the video amplifier and is fed from the target electrode 21 of a monoscope 20 of conventional type having a cathode 22, vertical deflection plates 23, horizontal deflection plates 24, and grid focusing auxiliary electrodes (not shown) of well-known conventional design. An electron beam originating at the cathode 22 is accelerated toward a target anode 21 at the other end of the tube.

The target anode, in accordance with well-known practice, may be, for example, an aluminum oxide disc with alphanumeric and other special symbol characters deposited thereon in carbon or other desired material. When the electron beam from cathode 22 scans an area of target 21, secondary emission characteristics will vary depending upon whether the beam strikes the aluminum oxide target or a portion of the carbon character positioned thereon to produce an output signal.

The vertical deflection plates 23 of the monoscope 20 are fed from a vertical or Y deflection amplifier 25, while the horizontal deflection plates 24 are fed from a horizontal or X deflection amplifier 26. The purpose of the monoscope deflection amplifiers is to convert digital character codes into analog voltages for deflecting the monoscope scan. Y deflection amplifier 25 has an output derived from a Y axis digital-to-analog converter 27, while X deflection amplifier 26 is fed from an X axis digital-to-analog converter 28. Digital-to-analog converters 27 and 28 include well-known storage registers (not shown) which are connected in parallel with character entry shift register 30 so that when a digital code is in the character entry shift register, it is also in the storage registers of the digital-to-analog converters 27 and 28.

The digital character code is a six-bit binary code, the three most significant bits of which are fed to the X axis digital-to-analog converter 28 for positioning the monoscope scan on the X axis, while the three least significant bits are fed to the Y axis digital-to-analog converter 27 for positioning the monoscope scan on the Y axis. The six-bit digital character code is formed in a keyboard 41 which contains, for example, a diode matrix for producing the requisite code. Keyboard 41 includes character keys which are capable of producing visual characters on the cathode ray tube screen and may include, for example, the letters A through Z and the number 0 through 9.

The message available line 42 is fed from a message available shift register 40 which transfers codes from the cathode ray tube selection switches or from function keys which may be present on the keyboard. These codes are detected by the computer software which responds in a manner determined by the program. When a key is depressed on the keyboard, a magnetically actuated reed switch within the key allows current to flow through a branch of the keyboard matrix as will be explained with reference to FIG. 7. The matrix output is a six-bit digital code coupled over six output lines designated KB-1 ... KB-6. In addition, a strobe signal is produced each time a character key is depressed, which signal is a DC level but could be a pulse, the function of which is to prepare character entry shift register 30 to receive the six-bit digital character code.

As will be explained with reference to FIG. 7, the cathode ray tube selection switch code is a five-bit digital code which is coupled over lines KB-1 through KB-5 to the message available shift register 40. To accomplish this each line selector switch is connected to the same diode matrix as the character keys for generation of the five-bit digital code.

Line level generator 38 and function clear pulse generator 39 gate the message available register 40 when a cathode ray tube selection switch is depressed, line level generator 38 providing a logic signal indicative of the fact that a cathode ray tube selection switch has been depressed and function clear pulse generator 39 providing a pulse in response to the raised keyboard strobe signal, the combination of which transfers the five-bit cathode ray tube selection code from lines KB-1 through KB-5 into message available shift register 40.

The six-bit character code, one formed, is parallel transferred into the character entry shift register 30. The digital code may also originate in the central memory of central computer 37 and may, through a suitable buffer, be parallel transferred or serially shifted bit by bit into the character entry register. Whether a digital character code originates at keyboard matrix 41 or at the central memory in computer 37, one in the character entry shift register 30 it is serially shifted out of register 30 into delay line 35. The character code is parallel transferred to the appropriate storage register in the Y and X digital-to-analog converters 27 and 28 to provide the analog voltages necessary for monoscope beam positioning, thereby providing the intensity modulation through video amplifier 33 which generates the character display on the cathode ray tube screen.

The character code is delayed for a period of time approximately corresponding to the frame scan time in the delay line, which in the present embodiment is approximately 67 scans per second, requiring a delay of approximately 14.78 milliseconds. The frame time is the time required for the cathode ray tube scan to move from a character position on the screen through a complete scan cycle and back to the original character position, and is the sum of the delay line delay and shift register delay. One character time after the character code is serially shifted out of character entry shift register 30, register 30 is cleared, the last bit of the character code has entered the delay line, and the cathode ray tube scan has moved to the next character position on the screen. The delay line refresh memory loop refreshes register 30; hence, the display 67 times a second.

Figure 2:
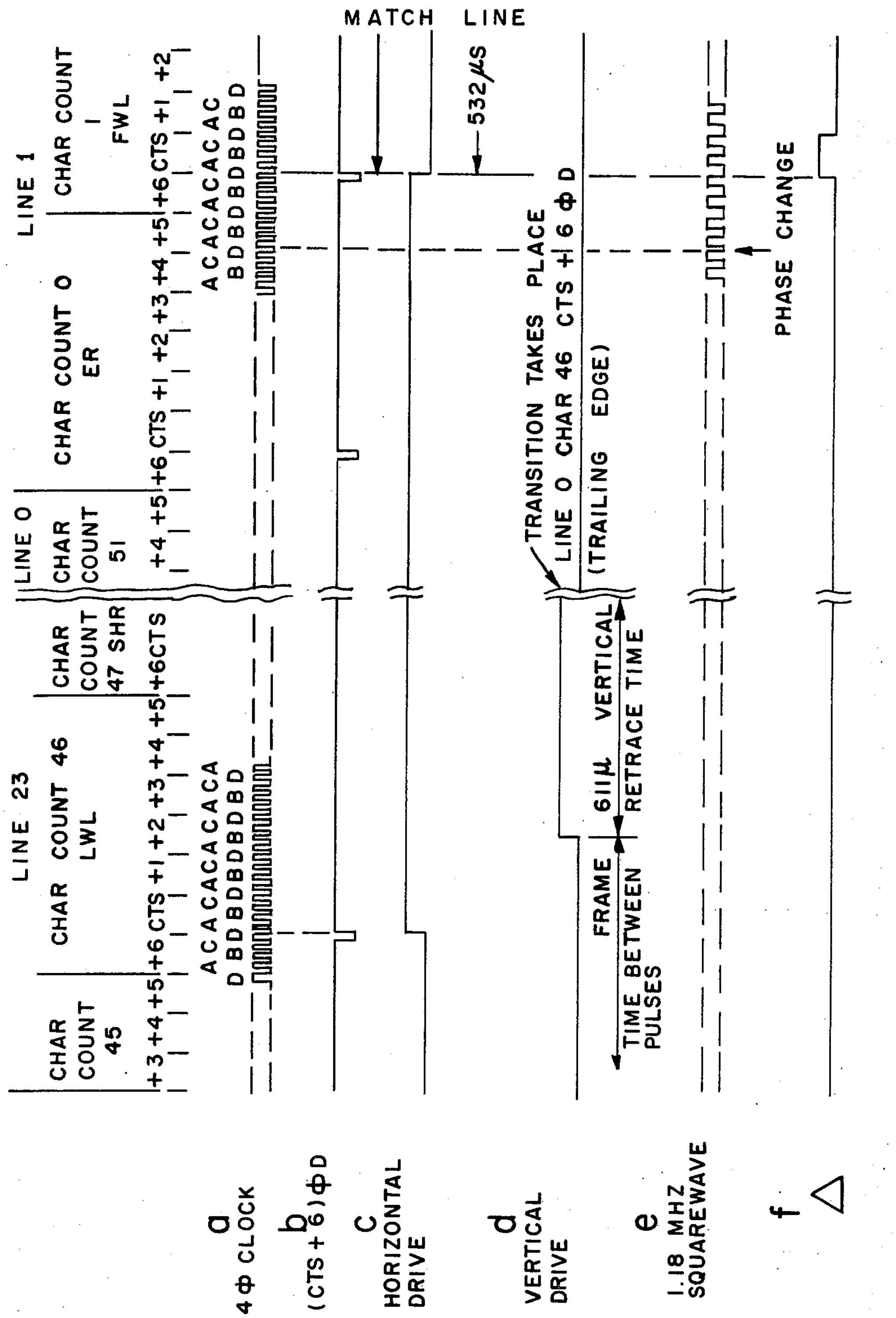
FIGS. 2, 3, and 4 show various waveforms present in the invention.
Figure 3:
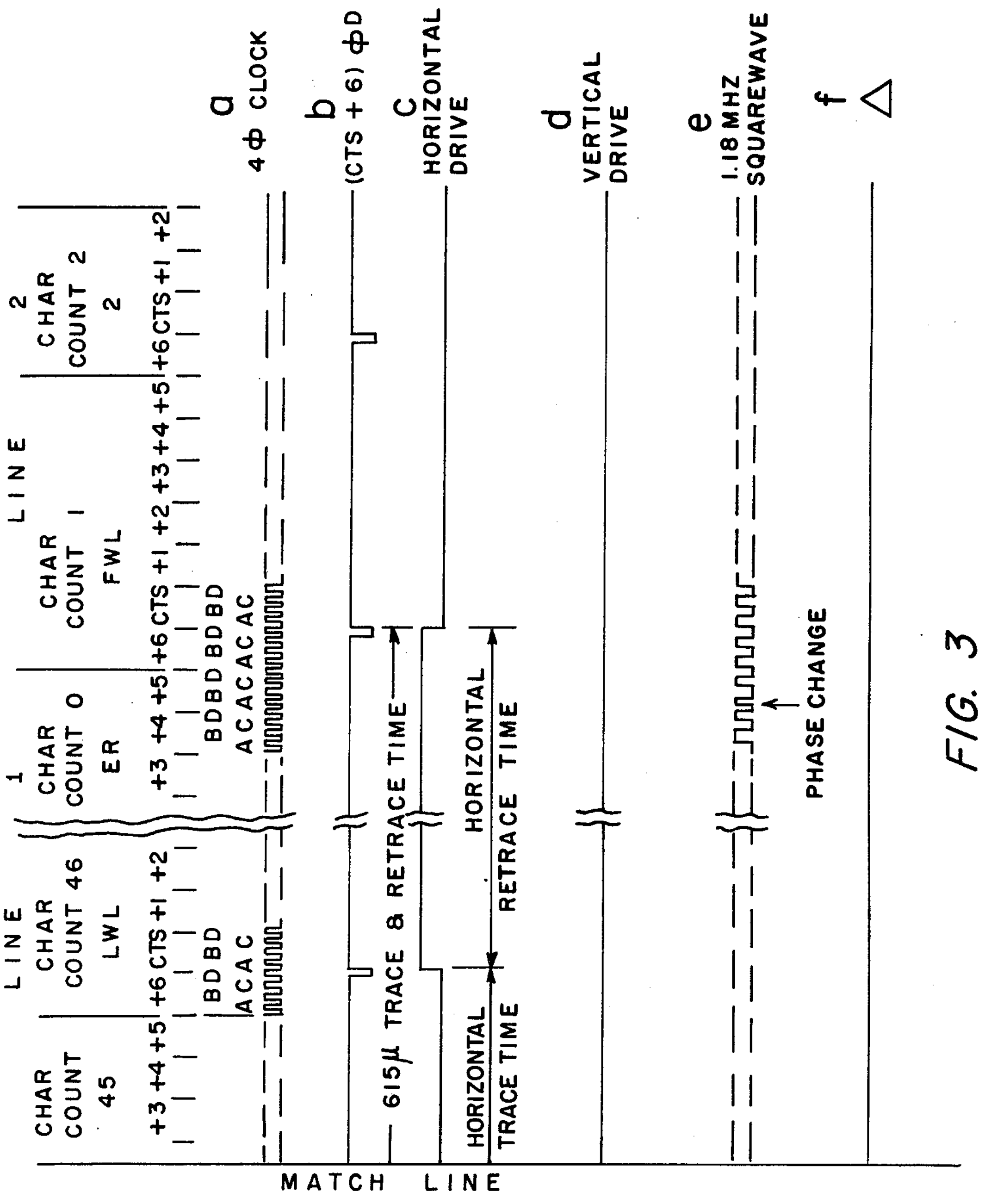

The horizontal drive timing signal shown in FIGS. 2*c* and 3*c*, fed to X deflection amplifier 26 from a central timing source, is an 83-microsecond gate pulse which represents the horizontal line retrace time and is equivalent to seven character times. This pulse is followed by a 532-microsecond interval which corresponds to the horizontal trace time required to enter 45 characters into the memory. Thus, the 83-microsecond gate signals occur at 615-microsecond intervals, which is the combined horizontal line trace and retrace period. When the X deflection amplifier receives this horizontal drive timing pulse, a sawtooth generator in the X deflection amplifier is triggered and the resulting sawtooth is amplified and applied to the horizontal deflection coil 12 as a linearly increasing current that moves the electron beam horizontally across the cathode ray tube screen.

The vertical drive timing a vertical retrace signal shown in FIGS. 2*d* and 3*d* is fed to the vertical deflection amplifier 32 from the central timing source triggering a sawtooth generator similar to that used in horizontal deflection amplifier 31. The resulting sawtooth is combined with a portion of the sawtooth from horizontal deflection amplifier 31 and applied to vertical deflection coil 13. Thus, the sawtooth that drives the sweep downward has a horizontal step for each horizontal line during the time that the horizontal sweep occurs. The horizontal sweep applied to the vertical amplifier is used to correct any slant of the horizontal line caused by the vertical deflection, thereby maintaining a constant vertical deflection until the end of the horizontal sweep which results in perfectly horizontal sweeps.

The vertical drive pulse is a gate pulse 611 microseconds wide, which corresponds to one horizontal line time and is the vertical retrace time. These gates are approximately 14.78 milliseconds apart, which represents the frame time or the time necessary to generate 23 horizontal line pulses plus the vertical retrace time. The frame scan rate or refresh time in the embodiment illustrated is 67 cycles per second. As shown in FIGS. 2*c* and 3*c*, the leading edge of the horizontal gate pulse occurs in the character time slot plus six, phase D (CTS + 6, $\phi$D), shown in FIGS. 2*b* and 3*b*, of the 46 characters counted (the end of a line), and the trailing edge occurs at the first character count of the line in the (CTS + 6, $\phi$D) timing slot. The leading edge of the vertical drive pulse occurs at (CTS + 2, $\phi$B) during character count 46 line 23 (the last character of the last line). The timing will be explained in more detail with reference to FIG. 6.

A Y axis expansion amplifier 29 drives the high-frequency auxiliary deflection coil 14 with a sinusoidal waveform at 1.18 megacycles in the embodiment shown although the frequency used may lie in the 1 megacycle plus a fraction range. A square wave signal developed in the timing circuitry and shown in FIGS. 2*e* and 3*e* is phase shifted 180° on alternate cathode ray tube scans and is applied to the Y axis expansion amplifier 29, then to auxiliary deflection coil 14 which is a resonant circuit that changes the square wave signal to a sine wave which occurs at the rate of 12 times per character and which, when applied to coil 14, increases the horizontal line height, thereby increasing the character height on the cathode ray tube. Each horizontal line is made a width equal to the excursion produced by the high-frequency vertical deflection coil 14. The Y axis expansion amplifier output is also combined with the Y axis analog voltage in Y deflection amplifier 25, causing the monoscope beam to sweep up and down across a character symbol.

A signal applied to horizontal deflection amplifier 26 from character ramp generator 34 produces a sawtooth wave shape which develops a ramp voltage that will drive the monoscope electron beam across the character to be painted. No sawtooth is present during horizontal or vertical retrace due to blanking. The blank pulse is composed of three distinct pulses; (CTS + 1), horizontal drive, and vertical drive shown in FIGS. 4*j*; 2*c* and 3*c*; and 2*d* and 3*d*, respectively. When a (CTS + 1) pulse is present on the blank pulse line in combination with either a horizontal drive pulse or a vertical drive pulse, blanking occurs. When no vertical or horizontal drive pulses are present, the sawtooth generated in the character ramp generator 34 drives the beam horizontally across the character. The blanking pulse is also applied to the video amplifier during retrace and during intercharacter time (CTS), thereby synchronizing the operation of the monoscope with the cathode ray tube sweep and the intensity modulation of the cathode ray tube cathode 15 to reproduce the characters on the cathode ray tube screen.

Figure 5:
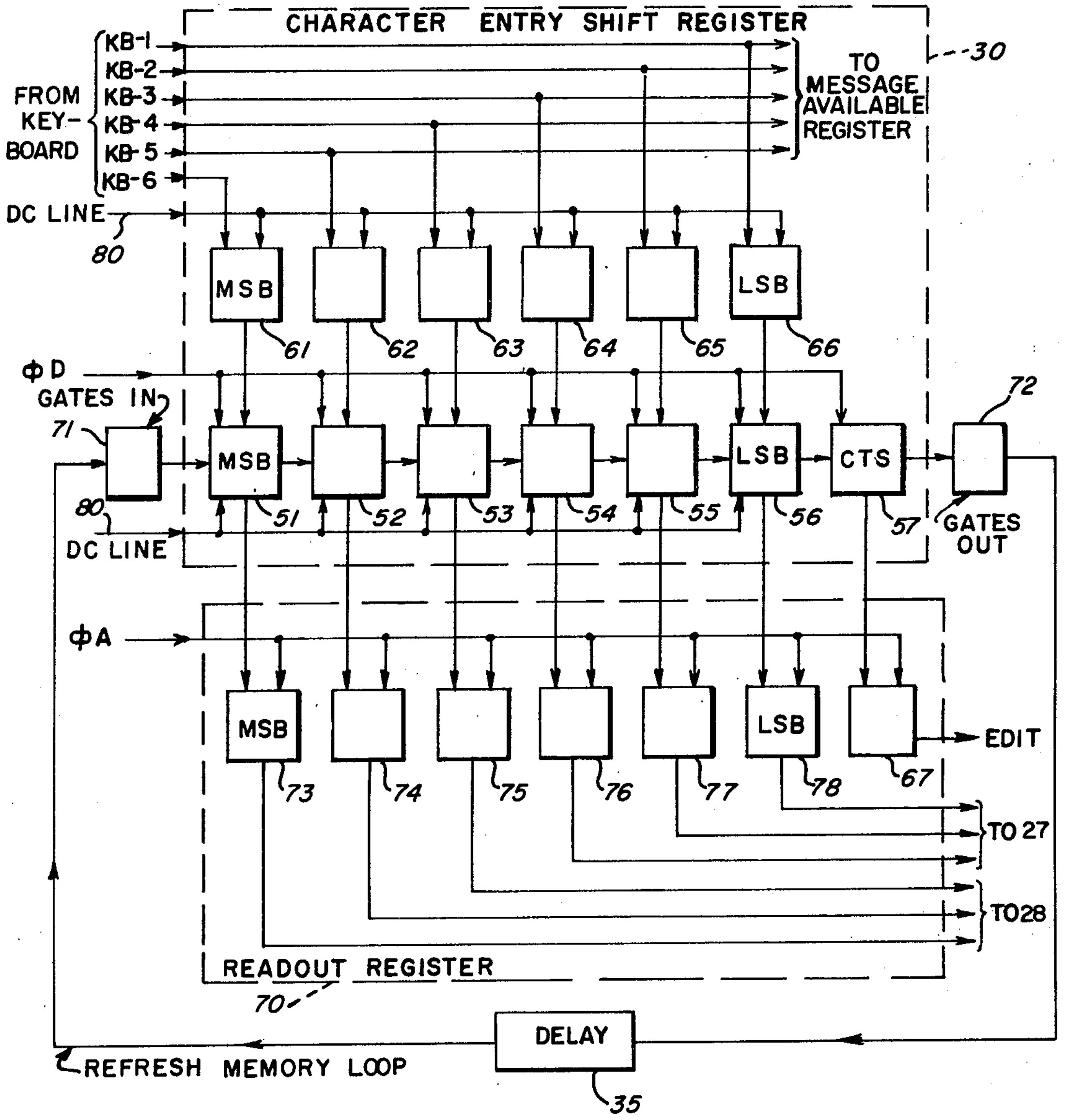
FIG. 5 is a block diagram of the recirculating memory.

The refresh memory loop shown in FIG. 5 consists of the character entry shift register 30, delay 35, and associated entry and exit gates 71 and 72, respectively. The purpose of the refresh memory loop is to provide a constant refresh or characters on the cathode ray tube screen.

As discussed with reference to FIG. 1, digital character codes, whether entered from keyboard 41 or from the central memory in computer 37, enter the refresh memory loop at character entry shift register 30, wherein the code is serially shifted bit by bit out of register 30 and into delay line 35 while simultaneously parallel transferred into storage registers in the Y and X digital-to-analog converters 27 and 28. Thus, when a cathode ray tube selection switch is depressed, the five-bit code associated with that switch is clocked through message available register 40 to computer 37 which responds with a complete 23-line frame of data which is entered into the character entry register, thereby enabling a complete raster of information comprising upwards of 1,500 character address signals to be dynamically stored in the recirculating delay line.

Register 30 is a seven-bit flip-flop shift register comprising flip-flops 51, 52, 53, 54, 55, 56, and 57 which perform the dual function of keyboard interface through data entry gates 61, 62, 63, 64, 65, and 66 and refresh memory access through data entry and exit gates 71 and 72, respectively. When a six-bit character address code is available for entry from the keyboard, the code is entered into register 30 only during the coincidence of a specified time slot and a recirculating bit in the entry shift register. This bit is constantly recirculated in the CTS time slot shown in FIG. 4i and appears in the character entry register 30 only once per frame time, or approximately once every 14.78 milliseconds and may be used for editing; however, editing is not essential to the operation of the present invention. Whenever a character code is available for entry, a DC signal is produced immediately after the formation of the character code, and applied along line 80 to data entry gates 61 through 66 and flip-flops 51 through 56 to clear register 30 for entry of the character code and to allow the recirculating bit to be located in register 30 in flip-flop 57. Since register 30 is series connected to the delay line, one of the characters or retrace characters circulating in the loop is always present in the register. When no editing is to be performed, as in the present system, the six bits contained in flip-flops 51 through 56 are parallel transferred to flip-flops 73 through 78 of the storage register in Y and X digital-to-analog converters 27 and 28. When editing is to be performed, a logical one would be present in flip-flop 57 which would be parallel transferred with the six-bit digital code to flip-flop 67, from which flip-flop an output controlling the editing would be produced; however, in the present embodiment, the CTS time slot is intercharacter time.

Figure 6:
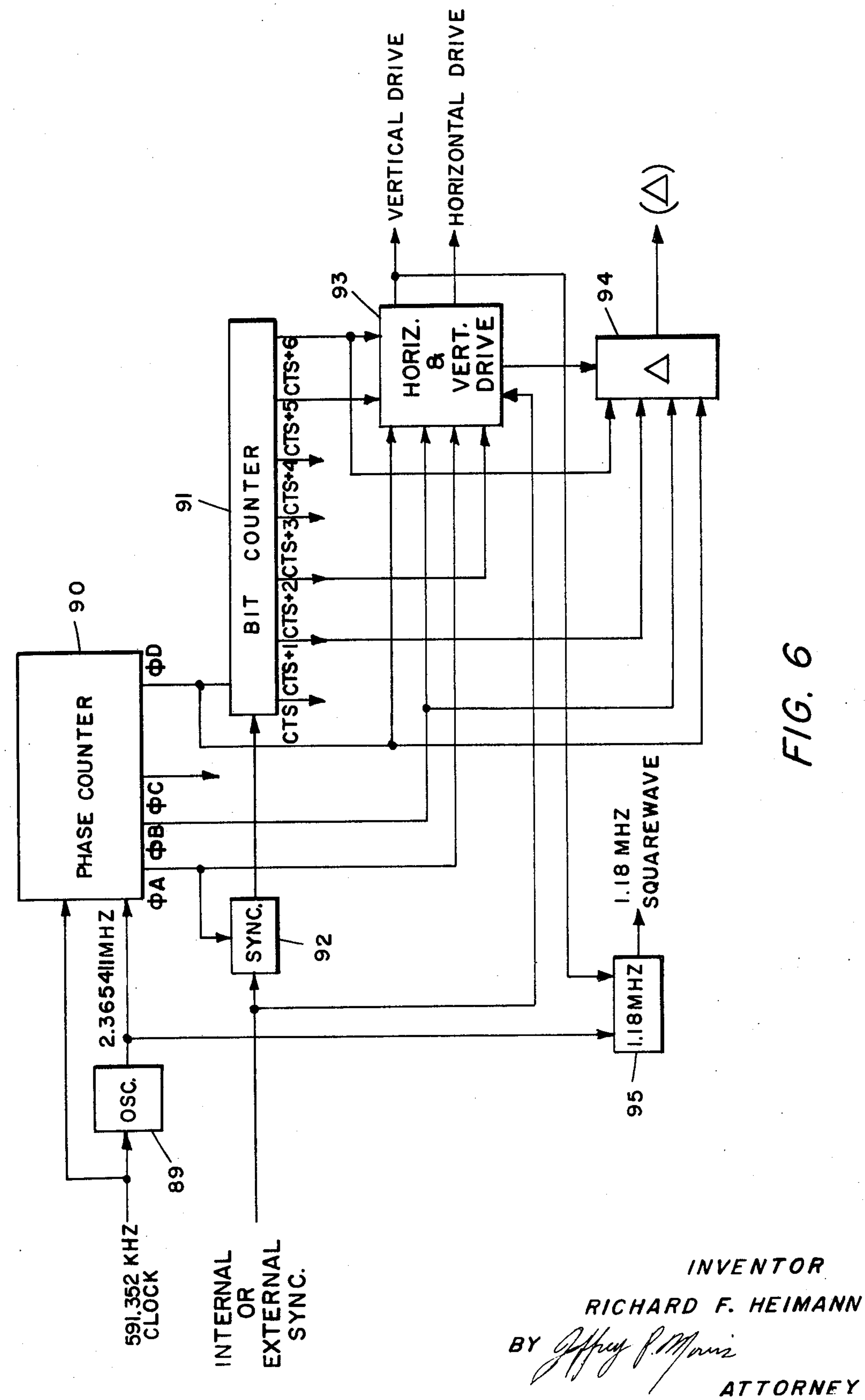
FIG. 6 is a block diagram of the timing circuitry.

As previously described, delay line data (7 bits per character) enters register 30 through input gate 71. Phase D clock pulses shown in FIG. 4*h* from the central timing source shown in FIG. 6 are applied to register 30 and characters are transferred least significant bit first. The seventh bit is the first to enter register 30 and is clocked into flip-flop 51 during the CTS time slot shown in FIG. 4*i*. The next six successive phase D pulses shift the six-bit character code into the register until after a total of seven bit times a complete character code is held therein. At phase A of the character time slot CTS, the character code is parallel transferred into X and Y digital-to-analog storage and read-out register 70 including flip-flops 73 through 78, and 67. Thus, the transfer is practically simultaneous with character entry into register 30 since phase A is just one-quarter of a character time from phase D.

Character codes are held in the storage register for one character time or for one CTS for read-out, during which time the monoscope beam is deflected to a specific position on target 21 to produce a visual character on the cathode ray tube screen in accordance with the character code held in read-out register 70. The six-bit code is divided into two three-bit segments, the three LSB's going to the Y digital-to-analog converter 27 and the three MSB's to X digital-to-analog converter 28.

Because the cathode ray tube line selection code is derived from the keyboard matrix and consists of only five bits, the most significant bit from line KB-6 is not transferred to the message available line but rather only the coding on lines KB-1 through KB-5 is transferred. The output of flip-flop 67 is applied to a line which is used when editing is desired.

The purpose of delay 35 is to dynamically store the character address signals which are recirculated in the refresh memory loop. Delay 35 is an internal storage device of the sonic or magneto-strictive type although other dynamic delays of well-known design may be used. Amplifiers (not shown) may be coupled to the input and output of delay 35 to compensate for data attenuation incurred in the delay line. An entire frame which may consist of 1,500 or more characters may be delayed on the delay line. In the present embodiment, upwards of 1,200 characters and retrace characters must be delayed approximately 14.78 milliseconds and refreshed approximately 67 times per second. The specific delay means may consist of 50 to 100 feet coiled wire, into which a magneto-strictive transducer converts electrical into mechanical energy which applies torsion to one end of the wire, which torsion travels down the wire at about 9 microseconds per inch and appears at the other end after a delay time dependent on the length of wire used. At the output end, the torsional movement is reconverted into electrical energy after a delay of, for example, seven to 15 milliseconds by a second magnetostrictive transducer and amplified, if necessary, before returning to the refresh memory loop.

The central timing source is shown in FIG. 6 and produces timing pulses for controlling data transfer and all other internal logical operations performed by the display terminal. All timing signals in the display terminal are originated by a 2.365411 MHZ oscillator 89 in the timing circuits, the waveform of which is shown in FIG. 4a. This oscillator is synchonized by a 591.352 KHZ clock which may be contained internally or externally when more than one unit is involved. This 592 KHZ waveform is shown in FIG. 4*b*.

There are six timing circuits: (1) the phase counter, (2) the 1.18 MHZ diddle circuit, (3) the bit counter, (4) the horizontal drive or retrace, (5) the vertical drive or retrace, and (6) the delta circuit (Δ) which times the first character of the first line on the cathode ray tube.

The phase counter 90 in FIG. 6 consists of dual flip-flops and decode gates. In phase counter 90, complement sync pulses furnished by the display control clock enter and are serially clocked through the phase counter flip-flops by the synchronized 2.365411 MHZ signal to produce outputs X and Y, the waveforms of which are shown in FIGS. 4*c* and 4*d*, respectively, and which are decoded along with the 2.365411 MHZ signal illustrated by FIGS. 2*a*, 3*a* and 4*a* to produce timing signals φA, φB, φC, and φD, the waveforms of which are shown in FIGS. 4*e*, 4*f*, 4*g*, and 4*h*, respectively. The outputs from the phase counter 90 are used throughout the display terminal to clock various operations during specific bit times as will become apparent.

Figure 4:
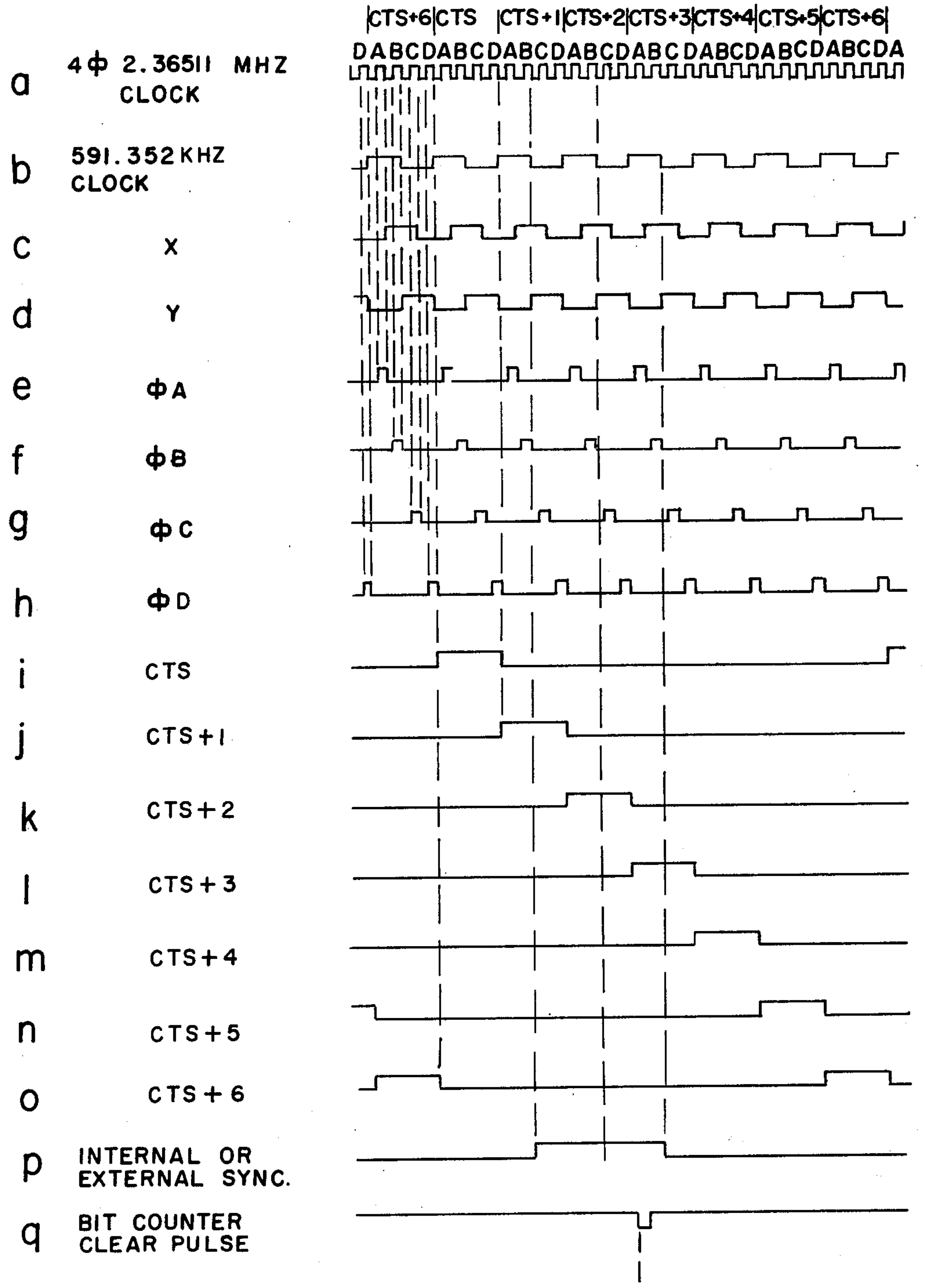

The specific bit time may be called a character time slot CTS. The relationship between the timing signals described above and the character time slot is shown by the waveforms of FIG. 4. Remembering that the 591 KHZ pulses and the 2.365 MHZ pulses applied to the phase counter are combined therein to produce four phases of the master clock, φA, φB, φC, and φD, and that the phase counter is made synchronous with either external or internal timing by means of a 2.365411 MHZ clock signal, circuit operation is enabled at the beginning, middle or end of each bit. The timing relationship is such that the time span from φA to φD is equal to one bit time which is approximately 1.69 microseconds.

The φD output is used within the timing circuits as a clock input to bit counter 91 which consists of three flip-flops in a divide by seven network, thereby producing seven outputs, CTS, (CTS + 1), (CTS + 2), (CTS + 3), (CTS + 4), (CTS + 5), and (CTS + 6), shown in FIG. 4 as waveforms *i*, *j*, *k*, *l*, *m*, *n*, and *o*, respectively. Character time slot, CTS, occurs at the first bit of a character and is coincident with the circulating additional bit in the memory or in the delay line, the bits of an entire character being CTS through (CTS + 6), with CTS as intercharacter time. The CTS timing pulse, waveform 4*i*, is used to locate the circulating bit and perform logical operations in coincidence with that bit. The character time slot plus one, (CTS + 1), shown in FIG. 4*j*, occurs in coincidence with the least significant bit LSB of the six-data bits of the character. The (CTS + 1) timing pulse may be used to gate additional data into the delay line memory. The (CTS + 2) through (CTS + 5) pulses are character intervals occurring in coincidence with data bits 2 through 5 and are used as timing pulses for gating data into the delay line memory and to perform logical operations coincident with the corresponding time slots. The (CTS + 1) pulse occurs in coincidence with the most significant bit MSB of the six data bits of a character. The (CTS + 6) timing pulse is used to perform operations in coincidence with the (CTS + 6) time slot. The time span from CTS to CTS is 11.83 microseconds, which is equivalent to one character time.

The bit counter 91 is synchronized to the (CTS + 3) count each time either an internal or external sync pulse is received by flip-flop 92 which causes bit counter 91 to start counting at a binary 0 at (CTS + 3) by means of a clear bit counter pulse shown in FIG. 4*q* and syncs the bit counter at (CTS + 3) during character 46 line 23 phase A to a binary count of zero. Once the bit counter is synchronized, the flip-flops therein continuously cycle through the seven count sequency.

As previously mentioned, the sync pulses, shown in FIG. 4*p*, are used to develop the horizontal and vertical drive signals. The horizontal drive or horizontal retrace pulse is used to indicate the time required for the cathode ray tube scan to retrace from the end of the line to the beginning of the next line, which is approximately 82.81 microseconds or seven character times.

The horizontal retrace circuit 93 consists of a flip-flop and two input gates which generate the 82.81-microsecond gate signal shown in FIG. 3*c*. The leading edges of this pulse occur at character count 46 in the φD portion of the (CTS + 6) time slot as is apparent from FIG. 3*c*. This gate pulse is followed by a 532-microsecond interval which represents the horizontal line trace time required to enter 45 characters into the memory. Thus, it takes 615 microseconds for the combination of horizontal retrace and trace of single line to occur. At φA of the (CTS + 5) time slot of character 0 on line 1, the horizontal retrace is synced clear and appears on the trailing edge of $\phi$D of the (CTS + 6) time slot during character count 46 and 1 of each line. The output of the same flip-flop that provides the horizontal retrace is inverted and also provides the vertical retrace pulse.

The vertical retrace pulse is used to indicate the time required for the cathode ray tube scan to move from the last horizontal line up to the first horizontal line which is equivalent to 52 characters of 615 microseconds. When a gate detects a vertical retrace pulse along with the sync pulse shown in FIG. 4*p*, the pulse is developed in a flip-flop in vertical drive circuit 93 (the inversion of the horizontal output) which is the vertical retrace pulse shown in FIGS. 2*d* and 3*d*. The leading edge of $\phi$B during the (CTS + 2) time slot character count 46 line 23 presets the vertical retrace generation flip-flop which is cleared by the leading edge of the positive horizontal retrace pulse which occurs at the leading edge of $\phi$B in (CTS + 1) time slot of character 46 line 0. The vertical retrace time is a pulse approximately 611 microseconds wide, which is approximately equal to the horizontal line time. The gates are separated by the frame time, 14.78 milliseconds, which is the time necessary to generate 23 horizontal lines plus the vertical retrace time. The refresh rate is 67 Hertz.

The delta pulse shown in FIGS. 2f and 3f is developed in logic circuitry 94 which consists of two flip-flops and associated decode gates (not shown). This pulse is used throughout the display logic to initiate various display functions. It corresponds to the first word of each line and is reset during (CTS + 1) phase B of the next character. Other control signals are developed in their respective time slots by various flip-flops and decode gates similar to those described above and these signals produce various timing pulses throughout the logic circuitry.

The 1.18 MHZ square wave generator 95 supplies a square wave which is applied to the monoscope deflection amplifier in the vertical expansion generator which feeds the Y deflection amplifier and also a coil on the neck of the cathode ray tube as previously explained with reference to FIG. 1. The signal is used to modulate the horizontal deflection voltage to increase the line height on the cathode ray tube screen to approximately 0.17 inch in the present embodiment. However, any suitable line height may be obtained by varying the excursion of the generated square wave.

Figure 7:
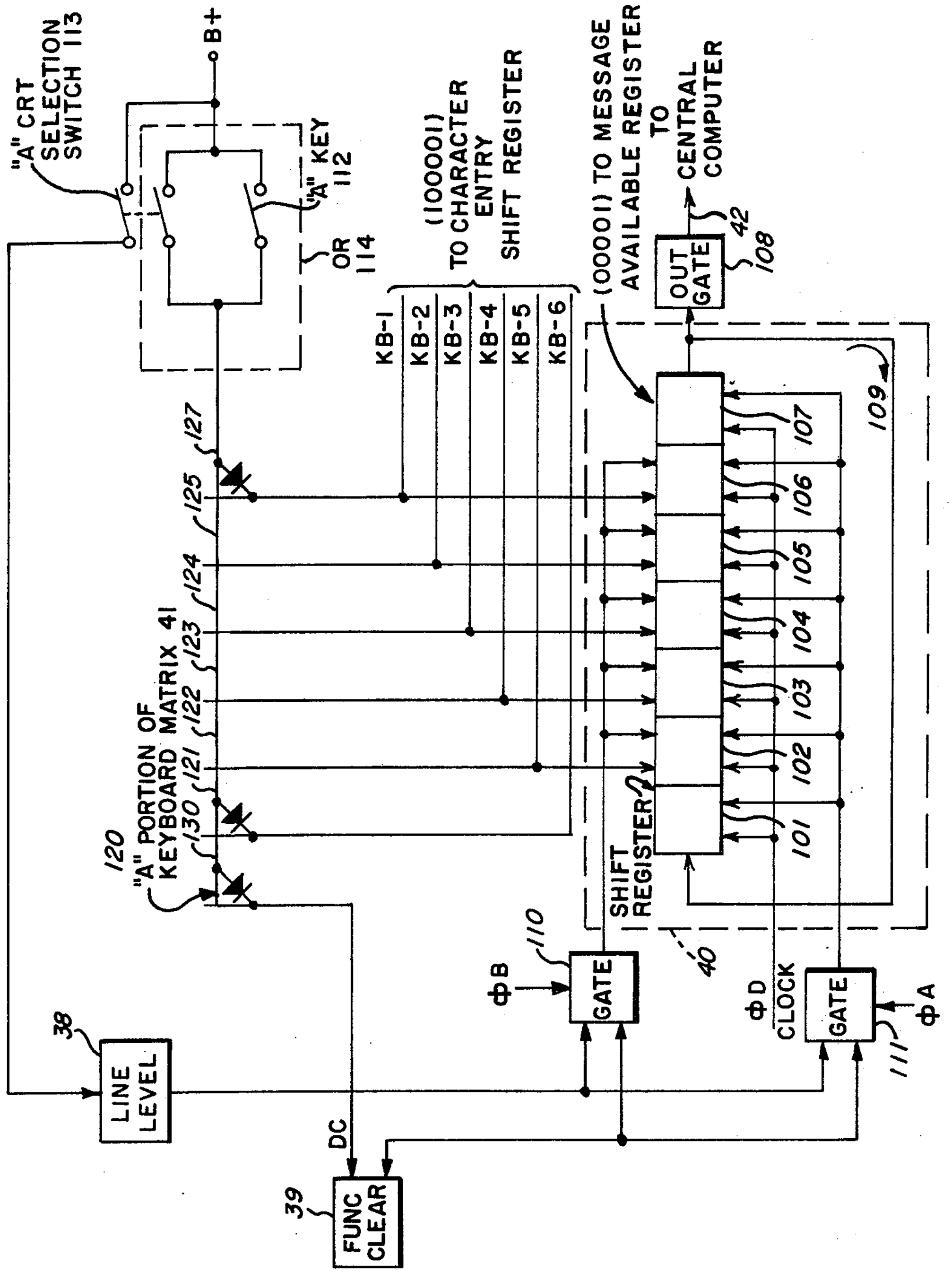
FIG. 7 is a block diagram of the section switch circuitry.

Referring now to FIG. 7, the generation of the five-bit cathode ray tube line selection code will be explained. As previously mentioned in connection with FIG. 1, the 20 cathode ray tube line selection switches A through T are OR'ed with the letters A through T on the keyboard, thereby using the same diode matrix which generates the six-bit character codes to generate the five-bit cathode ray tube line selection code. The five-bit cathode ray tube line selection code is applied to message available shift register 40 along lines KB-1 through KB-5 as illustrated in FIG. 7.

The MSB of the code generated in the diode matrix is made zero (0) in the message available register since nothing is coupled along line KB-6 to register 40. When a cathode ray tube line selection switch, such as A, which is shown as switch 113, is actuated, the keyboard matrix receives an input as if the A key 112 on the keyboard has been actuated since switch 113 and switch 112 are OR'ed. In OR circuit 114, the A portion of the character key matrix of keyboard 41 is shown. The possible cathode ray tube line selection codes are:

| CRT Line Selection Switch | Character Code KB-6 (MSB) | KB5 | KB-4 | KB-3 | KB-2 | KB-1 (LSB) |
|---|---|---|---|---|---|---|
| A | (1) | 0 | 0 | 0 | 0 | 1 |
| B | (1) | 0 | 0 | 0 | 1 | 0 |
| C | (1) | 0 | 0 | 0 | 1 | 1 |
| D | (1) | 0 | 0 | 1 | 0 | 0 |
| E | (1) | 0 | 0 | 1 | 0 | 1 |
| F | (1) | 0 | 0 | 1 | 1 | 0 |
| G | (1) | 0 | 0 | 1 | 1 | 1 |
| H | (1) | 0 | 1 | 0 | 0 | 0 |
| I | (1) | 0 | 1 | 0 | 0 | 1 |
| J | (1) | 0 | 0 | 0 | 1 | 0 |
| K | (1) | 0 | 1 | 0 | 1 | 1 |
| L | (1) | 0 | 1 | 1 | 0 | 0 |
| M | (1) | 0 | 1 | 1 | 0 | 1 |
| N | (1) | 0 | 1 | 1 | 1 | 0 |
| O | (1) | 0 | 1 | 1 | 1 | 1 |
| P | (1) | 1 | 0 | 0 | 0 | 0 |
| Q | (1) | 1 | 0 | 0 | 0 | 1 |
| R | (1) | 1 | 0 | 0 | 1 | 0 |
| S | (1) | 1 | 0 | 0 | 1 | 1 |
| T | (1) | 1 | 0 | 1 | 0 | 0 |

For the example illustrated, A has been selected. The "A" character binary code 100001 is generated in the individual diode matrix elements 121 through 126 of the A matrix 120, is fed to register 30 along lines KB-1 through KB-6 and to register 40 along lines KB-1 through KB-5 which effectively puts a zero logic level on the KB-6 MSB line with register 40 since there is no connection therebetween, and the five-bit code 00001 is inputted to computer 37 along the message available line 42 in the (CTS + 1) through (CTS + 5) time slots during alternate character times beginning with the character one time slot.

Additional message available register inputs may occur in coincidence with the delta (first character, first line) pulse shown in FIGS. 2*f* and 3*f*.

The depression of a cathode ray tube line selection switch grounds a line (not shown) which produces a logic (0) which causes flip-flop 38 to apply a gating signal to gates 110 and 111. Also, a DC strobe signal is produced from matrix element 130 when connected to B+ by OR circuit 114, which outputs B+ when either a cathode ray tube selection switch or a corresponding keyboard key is actuated. This output is fed to flip-flop 39 which develops a Function Clear pulse in response to the raised strobe signal. Of course, a pulse rather than a DC level could be used as a strobe. The Function Clear pulse is applied to gates 110 and 111 along with the line level output from flip-flop 38. These two inputs together initiate control for transferring a line selection code from lines KB-1 through KB-5 to register 40, flip-flops 102–106.

When the cathode ray tube selection switch is released, the input to flip-flop 38 changes and gates 110 and 11 prevent further data from entering register 40. Within 0.2 microseconds after the leading edge of the Function Clear pulse occurs, $\phi$A of CTS is applied to gate 111, developing a clear pulse which is applied to the clear input of each message available read-out register flip-flop 101 through 107, clearing the register of any data. Within 0.2 microseconds after the trailing edge of the clear pulse occurs, $\phi B$ of CTS is applied to gate 110, developing a pulse that parallel inputs the data on the KB-5 through KB-1 lines into register flip-flops 102 through 106. Once message available data bits have been parallel transferred to the message available read-out register, they are serially read out to the message available data line 42 in the (CTS + 1) through (CTS + 5) time slots along with the zero bit in the CTS and (CTS + 6) time slot. Bits on the MA data line are transferred through output gating circuitry to computer 37 as well as being serially read back into the read-out register for recirculation to provide continuous message available read-out.

Message available read-out and recirculation take place as follows. The clock pulse occurrring at phase D of CTS following the phase B pulse reads the LSB message available data bit from flip-flop 106 through flip-flop 107 to output gate 108 and to message available data line 42. The succeeding four message available data bits are serially read out by the nest four clock pulses, followed by the sixth clock pulse which reads out the zero bit in the (CTS + 6) time slot. As message available data bits are shifted right from flip-flop 107, they are fed from line 42 back to the data input of left-most flip-flop 101 of the read-out register. There, the message available data bits are reentered and serially clocked back through the register forming a chain of circulating bits continuously read to the message available data line.

It is to be understood that the details set forth herein are illustrative of the novel features that characterize the invention and that various changes and modifications are possible within the scope of the appended claims.

What is claimed is:

1. A digital data selection and display system comprising:
   - a visual display area having a plurality of display regions;
   - means including a movable electron beam for generating characters for display on said display regions in response to input signals;
   - a recirculating memory for storing said input signals in the form of character address codes;
   - means for coupling said input signals to said character generation means; and
   - means visually associated with said plurality of display regions for controlling said input signals.

2. A display system in accordance with claim 1, wherein said means visually associated with said plurality of display regions for controlling said input signals includes means for producing a complete change of the information content of said recirculating memory.

3. A display system comprising:
   - a cathode ray tube having a visual display area upon which characters are displayed in a plurality of lines $L_1, L_2 \ldots L_n$;
   - a recirculating memory wherein character address codes for the selection of complete characters for generation on said visual display area are stored;
   - a plurality of control means $X_1, X_2 \ldots X_n$ visually associated with said plurality of lines for generating control signals; and
   - character generation means for generating characters on the cathode ray tube responsive to the output of said recirculating memory, said memory output controlled by the control signals.

4. A display system in accordance with claim 3, further comprising:
   - means coupled to said plurality of control means for altering the character information on all of the lines $L_1, L_2 \ldots L_n$, in response to said control signals, thereby causing a different visual display each time a control signal is generated.

5. A display system in accordance with claim 4, wherein the cathode ray tube includes a faceplate through which the plurality of lines $L_1, L_2 \ldots L_n$ is viewed, and a plurality of indicia $I_1, I_2 \ldots I_n$, each indicia marking the correspondence between control means $X_1$ and line $L_1$, $X_2$ and line $L_2$, and $X_n$ and line $L_n$, such that an operator may manually select a particular control means in accordance with the character information on any particular line, by which selection the entire visual display is changed.

6. A display system in accordance with claim 5, further comprising a character entry means, said character entry means including a keyboard such that characters may be added to the visual display on selected lines.

7. A display system in accordance with claim 6, wherein said character entry means includes a shift register for adding characters to said visual display; and means for recirculating said characters in said memory such that they may be recalled only when the control means which was controlling the memory output at the time the added characters were entered generates a control signal to the memory.

8. A digital data selection and visual display system comprising:
   - a cathode ray tube having a visual display area upon which characters are displayed in a plurality of lines $L_1, L_2 \ldots L_n$;
   - a first memory wherein character information for the visual display is stored;
   - a plurality of control means $X_1, X_2 \ldots X_n$ visually associated with said plurality of lines for generating coded control signals;
   - character address code generation means coupled to a second memory for generating character address codes;
   - storage means in said second memory for storing said character address codes;
   - means for recirculating said character address codes;
   - means for non-destructively transferring said recirculated character address codes;
   - character generation means for generating characters on the cathode ray tube responsive to said transferred character address codes from said second memory, the output of which is controlled by the output of said first memory; and
   - means for transferring said control signals to said first memory for changing the character address code content of said second memory.

9. A digital data selection and visual display system in accordance with claim 8, wherein said character code generation means includes means for generating said coded control signals.

10. A digital data selection and visual display system in accordance with claim 9, wherein said character code generation means is a keyboard including a diode matrix for the generation of digital codes.

11. A digital data selection and visual display system in accordance with claim 10, wherein said character address code generation means include means for generating character address codes of n bit length from coded control signals of $(n-1)$ bit length.

12. A digital data selection and visual display system comprising:

a cathode ray tube having a visual display area upon which characters are displayed in a plurality of lines $L_1, L_2 \ldots L_n$;

a first memory wherein character information for the visual display is stored;

a plurality of control means $X_1, X_2 \ldots X_n$ associated with said plurality of lines for generating control signals;

a second memory wherein digital character address codes are stored, recirculated and non-destructively transferred;

means for generating characters on the cathode ray tube responsive to said transferred digital character address codes from said second memory such that said transferred codes are determined by the output of said first memory wherein said last-mentioned means includes a monoscope containing an electron gun and a plurality of target elements;

means for positioning the electron beam of said electron gun to scan selected portions on the target element to develop an output signal; and means for developing a visual display in response to said output signal, said last-mentioned means including said cathode ray tube.

13. A digital data selection and visual display system in accordance with claim 12, wherein the means for positioning the output of said electron gun includes a digital-to-analog converter for converting digital codes into analog voltages for positioning the monoscope scan in the X and Y directions such that a specific character on said monoscope may be scanned in accordance with said transferred digital character codes.

14. A digital data selection and visual display system in accordance with claim 13, wherein the means positioning the monoscope scan in the X and Y directions includes a modulation means for modulating the Y position analog voltage.

15. In combination:

a visual display area having a plurality of display regions;

recirculating memory means for storing and recirculating character address codes;

means for transferring said character address codes from said recirculating memory means;

character generation means for generating characters for display on said display regions in response to character address codes transferred thereto from said transfer means; and means visually associated with said display regions for selecting said address codes.

16. A combination in accordance with claim 15, wherein said display regions are parallel lines, each of which contains a plurality of alphanumeric characters; and wherein said means visually associated with said display regions is visually associated with said parallel lines.

17. A combination is accordance with claim 16, further comprising:

means coupled to said means visually associated with said display regions for effecting a complete alteration of alphanumeric characters in said parallel lines when said address codes are selected.

* * * * *